US009828848B2

(12) United States Patent
Coulston

(10) Patent No.: US 9,828,848 B2
(45) Date of Patent: Nov. 28, 2017

(54) WIRELESS PASSIVE PRESSURE SENSOR FOR DOWNHOLE ANNULUS MONITORING

(71) Applicant: Steve James Coulston, Houston, TX (US)

(72) Inventor: Steve James Coulston, Houston, TX (US)

(73) Assignee: BAKER HUGHES, a GE company, LLC, Houston, TX (US)

( * ) Notice: Subject to any disclaimer, the term of this patent is extended or adjusted under 35 U.S.C. 154(b) by 189 days.

(21) Appl. No.: 14/510,197

(22) Filed: Oct. 9, 2014

(65) Prior Publication Data

US 2016/0102545 A1    Apr. 14, 2016

(51) Int. Cl.
*G01V 3/00* (2006.01)
*E21B 47/06* (2012.01)
*E21B 47/12* (2012.01)
*G01L 19/00* (2006.01)

(52) U.S. Cl.
CPC ............. *E21B 47/06* (2013.01); *E21B 47/12* (2013.01); *G01L 19/00* (2013.01)

(58) Field of Classification Search
CPC ........... E21B 47/06; E21B 47/12; G01L 19/00
See application file for complete search history.

(56) References Cited

U.S. PATENT DOCUMENTS

| | | |
|---|---|---|
| 6,489,772 B1 | 12/2002 | Holladay et al. |
| 6,729,278 B2 | 5/2004 | Hammoud |
| 7,181,975 B1 | 2/2007 | Bradley et al. |
| 8,143,906 B2 * | 3/2012 | Coates ............. E21B 47/06 324/338 |
| 2003/0026167 A1 * | 2/2003 | Hahn ............. E21B 47/18 367/38 |
| 2003/0066671 A1 * | 4/2003 | Vinegar ............. E21B 47/12 174/47 |
| 2006/0287602 A1 | 12/2006 | O'Brien et al. |
| 2006/0289724 A1 * | 12/2006 | Skinner ............. G01D 5/268 250/221 |
| 2007/0084277 A1 * | 4/2007 | Steinsiek ............. E21B 47/101 73/152.18 |

(Continued)

OTHER PUBLICATIONS

Hu, Temporal and Spatial Properties of Arterial Pulsation Measurement Using Pressure Sensor Array, 2012.*

(Continued)

*Primary Examiner* — Quang D Pham
(74) *Attorney, Agent, or Firm* — Cantor Colburn LLP

(57) ABSTRACT

A downhole pressure sensor to measure absolute pressure in an annulus and a method of measuring absolute pressure in an annulus are described. The sensor includes an inductor including primary windings and secondary windings, and a capacitor coupled to the secondary windings and disposed in the annulus, at least one of the plates of the capacitor being flexible. The sensor also includes a controller coupled to the primary windings, the controller introducing an input signal to the primary windings and receive a return signal from the primary windings, the return signal resulting from the input signal being transferred through the secondary windings to the capacitor and back through the secondary windings to the primary windings. The controller determines the absolute pressure from the return signal.

17 Claims, 4 Drawing Sheets

(56) References Cited

U.S. PATENT DOCUMENTS

| | | | | |
|---|---|---|---|---|
| 2007/0149982 A1* | 6/2007 | Lyons | A61B 17/1604 | 606/99 |
| 2007/0235184 A1* | 10/2007 | Thompson | E21B 47/06 | 166/250.01 |
| 2008/0061789 A1* | 3/2008 | Coates | E21B 47/122 | 324/333 |
| 2009/0165547 A1* | 7/2009 | Steinsiek | E21B 47/101 | 73/152.32 |
| 2010/0262036 A1* | 10/2010 | Najafi | A61B 5/0031 | 600/561 |
| 2010/0268469 A1* | 10/2010 | Harrison | G01N 9/002 | 702/12 |
| 2010/0296366 A1* | 11/2010 | Kamata | G01V 1/164 | 367/25 |
| 2011/0252884 A1* | 10/2011 | Hanscombe | G01L 9/0008 | 73/32 A |
| 2012/0211278 A1* | 8/2012 | Gonzalez | E21B 47/06 | 175/40 |
| 2013/0104642 A1* | 5/2013 | Pelletier | E21B 49/10 | 73/152.47 |
| 2013/0118752 A1* | 5/2013 | Hannegan | E21B 47/0005 | 166/336 |
| 2013/0133415 A1* | 5/2013 | Toyofuku | B60C 23/0428 | 73/146.5 |
| 2013/0249705 A1 | 9/2013 | Sharp et al. | | |
| 2013/0257435 A1* | 10/2013 | Smithson | E21B 47/0905 | 324/338 |
| 2013/0257628 A1* | 10/2013 | Smithson | G01V 3/30 | 340/854.6 |
| 2013/0296721 A1* | 11/2013 | Yadav | A61B 5/0031 | 600/488 |
| 2013/0319103 A1 | 12/2013 | Mulford | | |

OTHER PUBLICATIONS

Chen et al., "Implantable Parylene-Based Wireless Intraocular Pressure Sensor", IEEE, 2008, pp. 58-61.

International Preliminary Report on Patentability for PCT Application No. PCT/US2015/048494, dated Apr. 11, 2017, pp. 1-5.

International Search Report and Written Opinion for PCT Application No. PCT/US2015/048494, dated Dec. 14, 2015, pp. 1-9.

* cited by examiner

WIRELESS PASSIVE PRESSURE SENSOR FOR DOWNHOLE ANNULUS MONITORING

BACKGROUND

Downhole exploration and production efforts involve a large number of sensors and measurement systems that provide information about the downhole environment. The downhole efforts fall into various categories that each involves different types of wells. Two main categories or phases of operation involved in well construction are drilling and completion. Drilling involves forming the well while completion involves readying the well using piping and storage apparatus. While the borehole walls may be bare during drilling, a (cement) casing is typically disposed downhole as part of the completion process to prevent collapse of the well walls, for example. In some downhole (e.g., subsea) completions, a first casing may be cemented to the well walls and a second casing may be hung inside. Tubing is introduced inside this second casing and is used for production. While sensors and measurement devices are commonly used in the annulus between the second casing and the tubing, monitoring conditions in the annulus between the first casing and the second casing may be more challenging.

SUMMARY

According to an embodiment of the invention, a downhole pressure sensor to measure absolute pressure in an annulus includes an inductor including primary windings and secondary windings; a capacitor coupled to the secondary windings and disposed in the annulus, at least one of the plates of the capacitor being flexible; and a controller coupled to the primary windings, the controller being configured to introduce an input signal to the primary windings and receive a return signal from the primary windings, the return signal resulting from the input signal being transferred through the secondary windings to the capacitor and back through the secondary windings to the primary windings. The controller is configured to determine the absolute pressure from the return signal.

According to another embodiment, a method of measuring absolute pressure in an annulus includes arranging an inductor in the downhole environment, the inductor including primary windings and secondary windings; arranging a capacitor in the annulus, the capacitor being coupled to the secondary windings and the capacitor including at least one plate that is flexible; disposing a controller coupled to the primary windings; introducing, using the controller, an input signal to the primary windings; receiving, using the controller, a return signal from the primary windings, the return signal resulting from the input signal being transferred through the secondary windings to the capacitor and back through the secondary windings to the primary windings; and determining the absolute pressure based on the return signal.

BRIEF DESCRIPTION OF THE DRAWINGS

Referring now to the drawings wherein like elements are numbered alike in the several Figures.

DETAILED DESCRIPTION

As noted above, the annulus between the first casing and the second casing in a downhole completion may be challenging. This is because it is desirable to maintain a sealed environment with static pressure in the annulus and, thus, it is undesirable to dispose hydraulic lines or other carriers typically used to power and convey conventional sensors. One parameter of interest is pressure. One option to measure pressure in the annulus between the first and second casings is via a battery powered device. However, the device must transmit the information it obtains through the second casing. Another approach involves powering electronics in the annulus of interest through the second casing, but this approach is prone to reliability issues. Embodiments of the systems and methods described herein relate to a wireless passive pressure sensor. While embodiments of the passive pressure sensor are detailed below with specific reference to measurement of pressure in the annulus between the first and second casings, it should be understood that the embodiments may instead be employed in other downhole environments such as, for example, in a lower completion or abandoned well.

Figure 1:
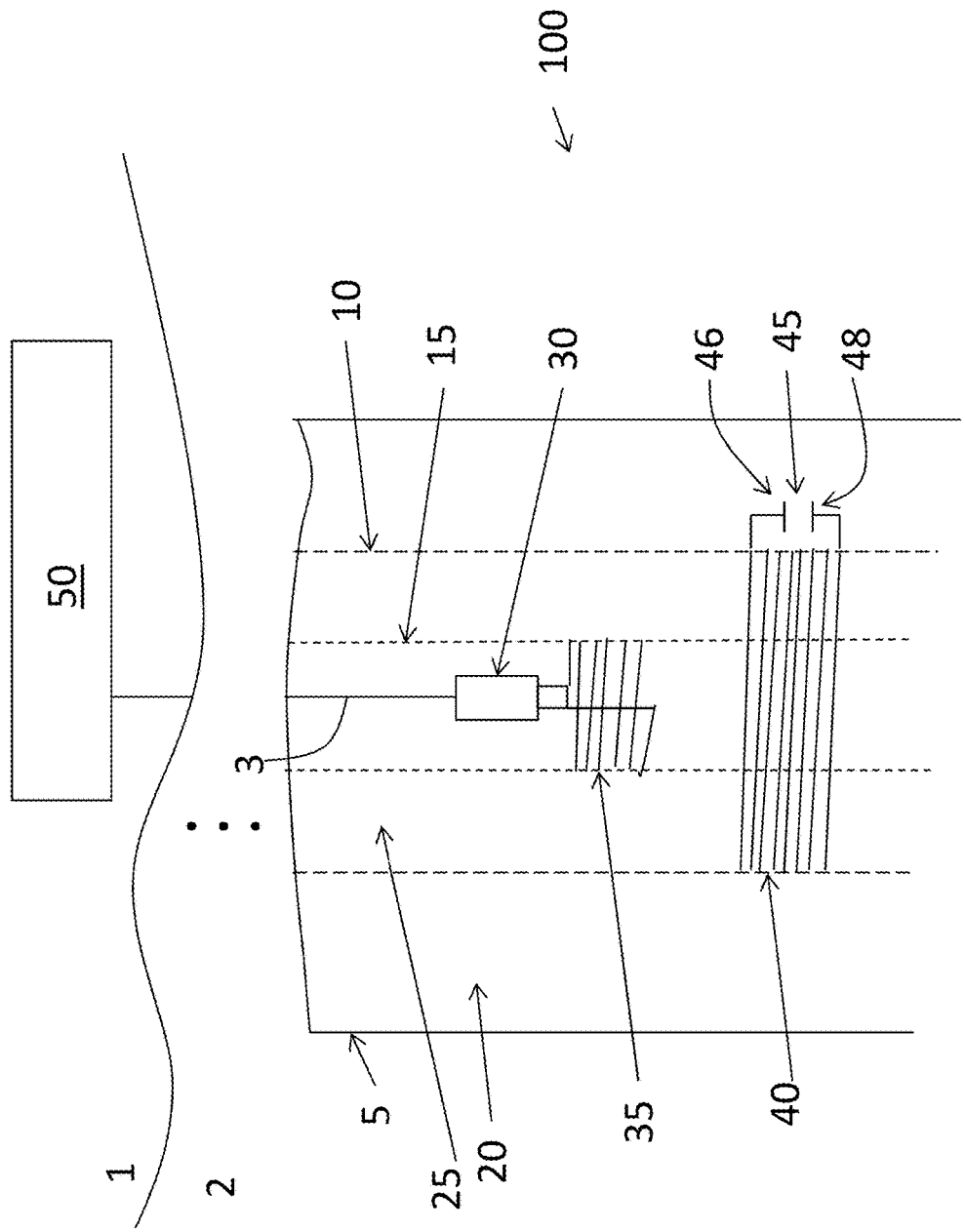
FIG. 1 is a cross-sectional view of the downhole pressure sensor according to an embodiment of the invention.

FIG. 1 is a cross-sectional view of the downhole pressure sensor 100 according to an embodiment of the invention. A first casing 5 is cemented in the downhole environment 2. The downhole environment 2 may be a subsea environment, for example. A second casing 10 is hung inside the first casing 5, creating annulus B 20. Tubing 15 disposed within the second casing 10, creating annulus A 25. The downhole pressure sensor 100 for annulus B 20 is a resonant circuit that includes an inductor with primary windings 35 and secondary windings 40, and a capacitor 45 with plates 46, 48. As indicated by FIG. 1, the capacitor 45 resides in annulus B 20. A controller 30 may be conveyed into the tubing 15 by a carrier 3 (e.g., armored wireline). The controller 30 both supplies a signal to and reads resonance from the resonant circuit. The controller 30 facilitates measurement of absolute pressure (rather than just relative pressure or pressure changes) using the resonant circuit. A surface system 50 may include one or more processors and one or more memory devices that may participate in the processing of data from the resonant circuit. The surface system 50 also includes an output interface which may include a display or communication interface to provide the pressure information from the downhole pressure sensor 100.

Figure 2:
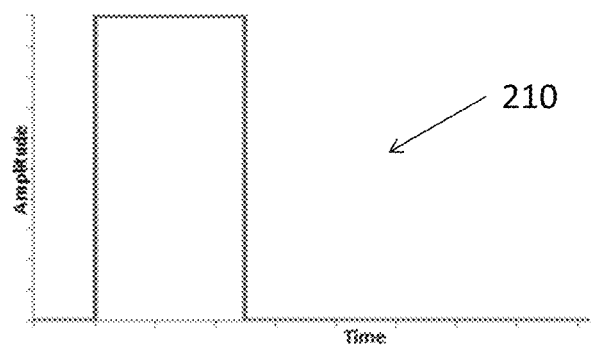
FIG. 2 illustrates an exemplary broadband signal introduced into the primary windings by the controller.
Figure 3:
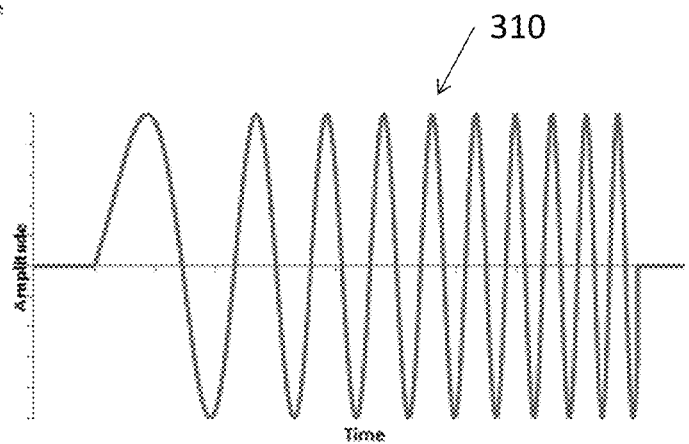
FIG. 3 illustrates an exemplary swept sinusoidal signal introduced into the primary windings by the controller.

According to one embodiment, the controller 30 may induce a resonance (ringing) effect in the inductor by inserting a single broadband spectrum in the primary windings 35. According to another embodiment, the controller inputs a frequency swept sinusoidal signal in the primary windings 35. The frequency of the swept signal ranges from the lowest to highest frequency associated with an expected range of pressure values. Each of the embodiments is illustrated in FIGS. 2 and 3. FIG. 2 illustrates an exemplary broadband signal 210 introduced into the primary windings 35 by the controller 30. FIG. 3 illustrates an exemplary swept sinusoidal signal 310 introduced into the primary windings 35 by the controller 30. According to either embodiment, the signal 210, 310 input by the controller 30 to the primary windings 35 goes through the secondary windings 40 to the capacitor 45 and then back through the secondary windings 40 to the primary windings 35 and, for processing, to the controller 30. At the controller or, in alternate embodiments, at the surface system 50, the return signal is analyzed. The frequency of the return signal corresponds to an absolute pressure value in annulus B 20. For example, in the second embodiment in which a frequency swept signal 310 is input by the controller 30, a peak or trough will appear at the frequency corresponding to the pressure in annulus B 20 in the return signal. This is because the capacitor 45 is made sensitive to the pressure in annulus B 20 by making one or both of its plates 46, 48 flexible. The flexible plate 46 or 48, or both, changes the electrical characteristic of the capacitor 45 based on a change in the pressure in annulus B 20 and, thus, changes the frequency of the return signal correspondingly. The pressure associated with a given return signal may be determined based on calibration in a laboratory setting. For example, based on several test pressure values in a lab environment, an algorithm associating the resonant frequency to the pressure may be generated by known techniques. A look-up table may be developed according to alternate embodiments.

Figure 4:
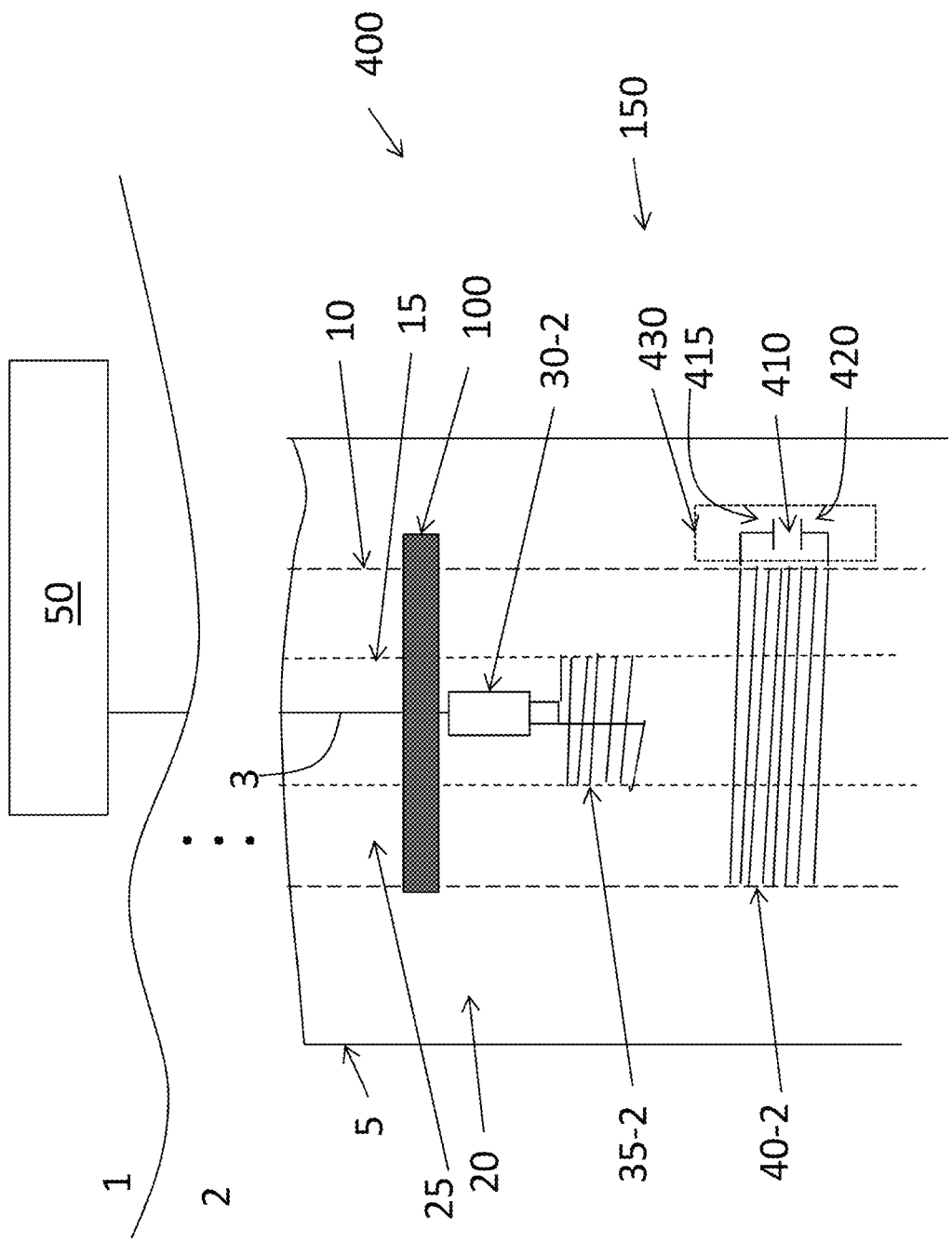
FIG. 4 is a cross-sectional view of the downhole pressure sensor according to another embodiment of the invention.

FIG. 4 is a cross-sectional view of the downhole pressure sensor 400 according to another embodiment of the invention. According to this embodiment, the downhole pressure sensor 400 includes the downhole pressure sensor 100 shown in FIG. 1 (not detailed again in FIG. 2) and, additionally, a second sensor, downhole temperature sensor 150. The downhole temperature sensor 150 may use the primary windings 35 of the downhole pressure sensor 100. In the embodiment shown in FIG. 4, the downhole temperature sensor 150 includes primary windings 35-2, in addition to secondary windings 40-2 and a second capacitor 410 to address temperature effects. The downhole temperature sensor 150 may include a second controller 30-2 as shown in FIG. 2. In alternate embodiments, the controller 30 shown in FIG. 1 may include multiple components (e.g., processor, memory device, signal generator) that facilitate control and processing of both of the sensors of the downhole pressure sensor 400. The second capacitor 410 is made insensitive to pressure according to one of two embodiments. In this way, the frequency of the return signal associated with the second capacitor 410 will only be affected by temperature. The frequency effect of temperature can then be removed from the return signal of the original capacitor 45 such that absolute pressure, compensating for temperatures changes, may be obtained. This processing may be done by the processor in controller 30, in controller 30-2, or at the surface system 50. Because temperature effects on pressure may be second or third order effects, the compensation for temperature may not be straight-forward (e.g., not a subtraction) but may involve an additional calibration in a laboratory environment. One embodiment by which the second capacitor 410 is made insensitive to pressure changes in annulus B 20 is by having both plates 415, 420 of the capacitor 410 be rigid (neither is flexible). Another embodiment by which the second capacitor 410 is made insensitive to pressure changes in annulus B 20 is by housing the second capacitor 410 in a pressure housing 430 such that the capacitor 410 experiences no pressure effects. That is, pressure in the housing 430 is held constant while temperature changes in annulus B 20 affect temperature in the housing 430.

Figure 5:
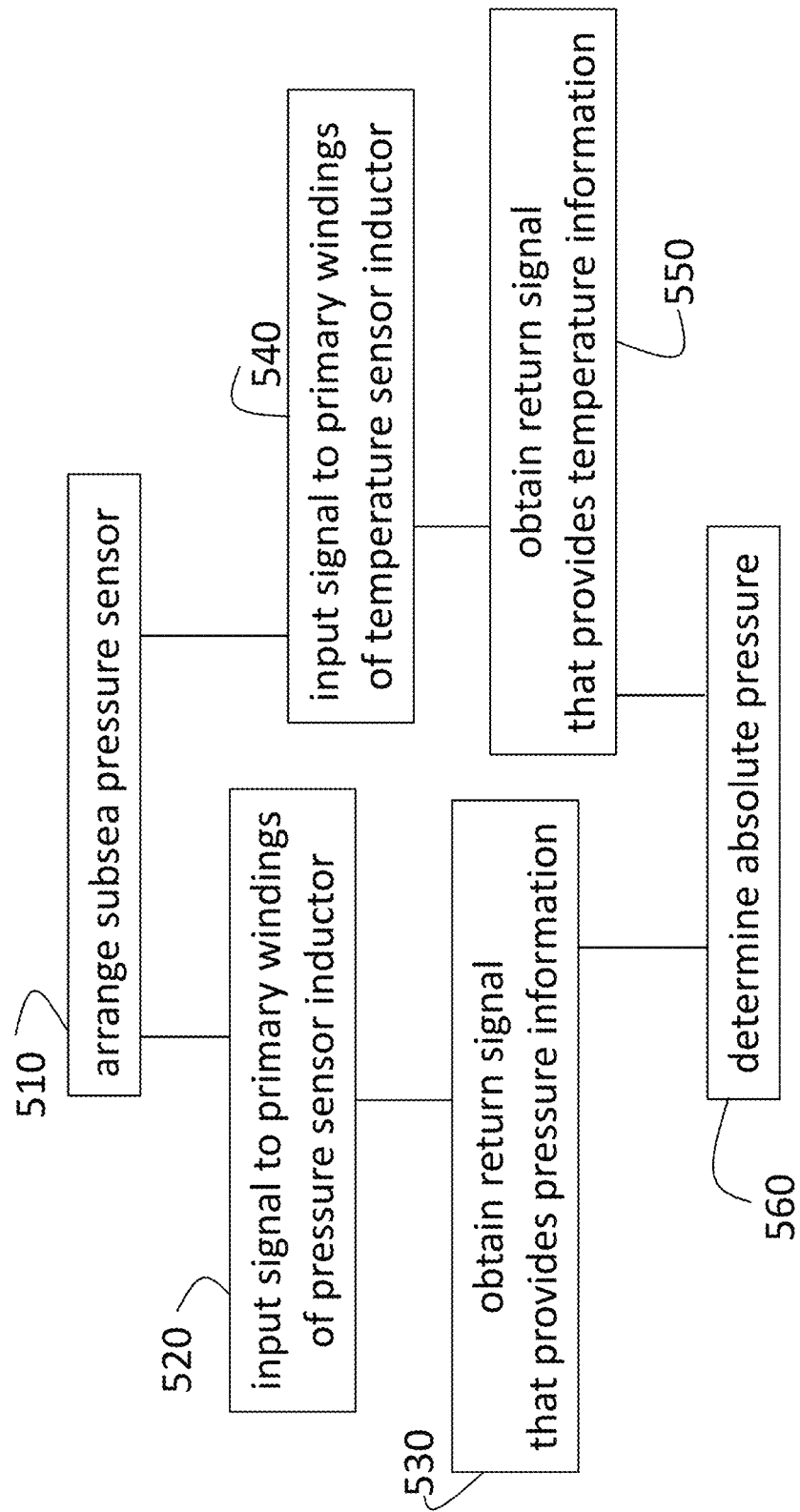
FIG. 5 is a process flow of a method of measuring pressure in an annulus between two casings according to embodiments of the invention.

FIG. 5 is a process flow of a method of measuring pressure in annulus B 20 between two casings 5, 10 according to embodiments of the invention. At block 510, arranging the downhole pressure sensor 100, 400 includes arranging one sensor (downhole pressure sensor 100) or two sensors (downhole pressure sensor 100 and downhole temperature sensor 150). At block 520, inputting a signal to the primary windings 35 of the pressure sensor 100 inductor includes the signal being transferred to the secondary windings 40 and the capacitor 45 back to the primary windings 35, where the return signal is affected by pressure in annulus B 20 where the capacitor 45 is disposed. At block 530, obtaining the return signal that provides pressure information is with the controller 30. Optionally, according to an alternate embodiment, the method further includes block 540. At block 540, inputting a signal to primary windings 35-2 of the temperature sensor 150 inductor includes the signal being transferred to the secondary windings 40-2 and the capacitor 410 that is housed in a pressure housing 430 or has both plates 215, 420 fixed such that the return signal is affected by temperature in annulus B 20. Also optionally, at block 550, obtaining the return signal that provides temperature information is with the controller 30-2 or may be with controller 30. At block 560, determining absolute pressure includes processing the (pressure) return signal obtained at block 530 and may additionally include removing the contribution of temperature based on the (temperature) return signal obtained at block 550.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A downhole pressure sensor to measure absolute pressure in an annulus, the sensor comprising:
    an inductor including primary windings and secondary windings, wherein the primary windings and the secondary windings are wound around different cores;
    a capacitor coupled to the secondary windings and disposed in the annulus, at least one plate of the capacitor being flexible; and
    a controller coupled to the primary windings, the controller being configured to introduce an input signal to the primary windings and receive a return signal from the primary windings, the return signal resulting from the input signal being transferred through the secondary windings to the capacitor and back from the capacitor directly to the secondary windings, through the secondary windings to the primary windings, wherein
    the controller is configured to determine the absolute pressure from the return signal, wherein the annulus is formed by a first casing and a second casing within the first casing, a tubing is disposed in the second casing, and the primary windings are wound around an outer surface of the tubing within the second casing and the secondary windings are wound around an outer surface of the second casing.

2. The sensor according to claim 1, wherein the controller is conveyed into the tubing by a carrier.

3. The sensor according to claim 1, wherein the input signal is a broadband signal.

4. The sensor according to claim 1, wherein the input signal is a swept frequency sinusoid that sweeps frequencies corresponding with pressure values in the annulus.

5. The sensor according to claim 1, wherein the controller determines the absolute pressure based on a frequency of the return signal.

6. The sensor according to claim 1, further comprising a downhole temperature sensor configured to determine temperature in the annulus.

7. The sensor according to claim 6, wherein the downhole temperature sensor includes the primary windings or second primary windings and second secondary windings and a second capacitor.

8. The sensor according to claim 7, wherein the second capacitor has fixed plates or is housed in a pressure tight housing and is coupled to the second secondary windings.

9. The sensor according to claim 7, wherein the controller or a second controller inputs a second input signal to the primary windings or second primary windings and receives a second return signal resulting from temperature effect on the second capacitor.

10. The sensor according to claim 6, wherein the controller determines the absolute pressure in the annulus based on eliminating an effect of the temperature in the annulus on the return signal.

11. A method of measuring absolute pressure in an annulus, the method comprising:
arranging an inductor in a downhole environment, the inductor including primary windings and secondary windings that are wound around different cores;
arranging a capacitor in the annulus, the capacitor being coupled to the secondary windings and the capacitor including at least one plate that is flexible;
disposing a controller coupled to the primary windings;
introducing, using the controller, an input signal to the primary windings;
receiving, using the controller, a return signal from the primary windings, the return signal resulting from the input signal being transferred through the secondary windings to the capacitor and back from the capacitor directly to the secondary windings, through the secondary windings to the primary windings; and
determining the absolute pressure based on the return signal, wherein the annulus is formed by a first casing and a second casing within the first casing, and the arranging the inductor includes winding the primary windings around an outer surface of a tubing inside the secondary casing and winding the secondary windings around an outer surface of the secondary casing, and the disposing the controller includes conveying the controller into the tubing by a carrier.

12. The method according to claim 11, wherein the introducing the input signal includes the controller generating a broadband signal.

13. The method according to claim 11, wherein the introducing the input signal includes the controller generating a swept frequency sinusoid that sweeps frequencies corresponding with pressure values in the annulus.

14. The method according to claim 11, wherein the determining the absolute pressure is based on a frequency of the return signal.

15. The method according to claim 11, further comprising arranging a temperature sensor in the annulus.

16. The method according to claim 15, wherein the arranging the temperature sensor includes arranging the primary windings or second primary windings and second secondary windings in the downhole environment and arranging a second capacitor coupled to the second secondary windings, plates of the second capacitor being fixed or housed in a pressure tight housing.

17. The method according to claim 15, wherein the determining the absolute pressure includes eliminating an effect of the temperature in the annulus on the return signal.

* * * * *